(12) United States Patent
Wang (10) Patent No.: US 9,804,953 B2
(45) Date of Patent: Oct. 31, 2017

(54) METHOD AND DEVICE FOR TESTING SEMICONDUCTOR MANUFACTURING EQUIPMENT AUTOMATION PROGRAM

(71) Applicant: Semiconductor Manufacturing International (Shanghai) Corporation, Shanghai (CN)

(72) Inventor: Yu Na Wang, Shanghai (CN)

(73) Assignee: SEMICONDUCTOR MANUFACTURING INTERNATIONAL (SHANGHAI) CORPORATION (CN)

( * ) Notice: Subject to any disclaimer, the term of this patent is extended or adjusted under 35 U.S.C. 154(b) by 0 days.

(21) Appl. No.: 14/868,977

(22) Filed: Sep. 29, 2015

(65) Prior Publication Data
US 2016/0140024 A1    May 19, 2016

(30) Foreign Application Priority Data
Nov. 18, 2014    (CN) .......................... 2014 1 0659442

(51) Int. Cl.
| G06F 9/44 | (2006.01) |
| G06F 11/36 | (2006.01) |
| G05B 19/418 | (2006.01) |

(52) U.S. Cl.
CPC .... *G06F 11/3664* (2013.01); *G05B 19/41835* (2013.01); *G06F 11/3688* (2013.01); *G05B 2219/45031* (2013.01)

(58) Field of Classification Search
None
See application file for complete search history.

(56) References Cited

U.S. PATENT DOCUMENTS

| 8,321,515 B1* | 11/2012 | Gailloux | ................. H04L 51/34 709/206 |
| 2003/0009709 A1* | 1/2003 | Belenger | ............. G06F 11/3688 714/37 |
| 2007/0299962 A1* | 12/2007 | Budzisch | ............ G06F 11/3668 709/224 |

FOREIGN PATENT DOCUMENTS

| CN | 101281404 A | 10/2008 |
| CN | 101526570 A | 9/2009 |

* cited by examiner

*Primary Examiner* — Qamrun Nahar
(74) *Attorney, Agent, or Firm* — Innovation Counsel LLP (57) ABSTRACT

A method for testing an equipment automation program may be implemented using a hardware device and may include the following steps: receiving user input through a user interface of the device; automatically identifying a test scenario based on the user input; automatically and sequentially fetching a plurality of messages according to the test scenario; and automatically and sequentially sending the messages to the equipment automation program.

20 Claims, 7 Drawing Sheets

```
MsgLabel: PutWaferComplete1_InlineSplit2: S6F11 W * Event report send
< L [3/1] L3
    <U2 [2/1] DATAID 1> * Data ID
    <U2 [2/1] CEID 47> * Collection event ID
    < L [1/1] La
        < L [2/1] L2
            <U2 [2/1] RPTID 4> * Report ID
            < L [2/1] Lb
                <U1 [1/1] V 1> * Variable data
                <U1 [1/1] V 2> * Variable data
            >
        >
    >
>.

MsgLabel: GetWaferComplete2_InlineSplit2: S6F11 W * Event report send
< L [3/1] L3
    <U2 [2/1] DATAID 1> * Data ID
    <U2 [2/1] CEID 45> * Collection event ID
    < L [1/1] La
        < L [2/1] L2
            <U2 [2/1] RPTID 4> * Report ID
            < L [2/1] Lb
                <U1 [1/1] V 2> * Variable data
                <U1 [1/1] V 1> * Variable data
            >
        >
    >
>.
```

FIG. 6

```
2013-01-15 10:31:51   Received: (SMIFDriver1 DeviceId 0)
S1F1 W
.

2013-01-15 10:31:51   Sent: (SMIFDriver1 DeviceId 0)
S1F2
< L [2/1] L
    <A [3/1] MDLN SMS>
    <A [3/1] SOFTREV 1.4>
>.

2013-01-15 10:31:51   Received: (SMIFDriver2 DeviceId 0)
S1F1 W
.

2013-01-15 10:31:51   Sent: (SMIFDriver2 DeviceId 0)
S1F2
< L [2/1] L
    <A [3/1] MDLN SMS>
    <A [3/1] SOFTREV 1.4>
>.

2013-01-15 10:31:51   Received: (EqpDriver1 DeviceId 0)
S1F13 W
< L [0/1] L2
>.

2013-01-15 10:31:51   Sent: (EqpDriver1 DeviceId 0)
S1F14
< L [2/1] L2a
    <B [1/1] COMMACK 0>
    < L [2/1] L2b
        <A [3/1] MDLN SMS>
        <A [3/1] SOFTREV 1.4>
    >
>.
```

FIG. 7

METHOD AND DEVICE FOR TESTING SEMICONDUCTOR MANUFACTURING EQUIPMENT AUTOMATION PROGRAM

CROSS-REFERENCE TO RELATED APPLICATION

This application claims priority to and benefit of Chinese Patent Application No. 201410659442.7, filed on 18 Nov. 2014; the Chinese Patent Application is incorporated herein by reference in its entirety.

BACKGROUND

The technical field is related to a method and a device for testing an equipment automation program (EAP). The EAP may facilitate equipment automation in manufacturing of semiconductor devices.

For minimizing errors in a manufacturing process of semiconductor devices, an equipment automation program (EAP) may be utilized for facilitating operations related to equipment used in the manufacturing process. For example, the EAP may facilitate process condition verification, process parameter setting, process data collection, etc. For ensuring functionality and reliability of the EAP, the EAP may need to be rigorously test before being used in the manufacturing process.

SUMMARY

An embodiment may be related to a method for testing an equipment automation program. The equipment automation program may facilitation automation of equipment in a semiconductor device manufacturing process. The method may be performed using a device that includes hardware. The method may include the following steps: receiving user input through a user interface of the device; automatically identifying a test scenario based on the user input; automatically and sequentially fetching a plurality of messages according to the test scenario; and automatically and sequentially sending the messages to the equipment automation program.

At least tens of the messages may be automatically sent from the device to the equipment automation program within a second.

The method may include the following steps: receiving the user input through a menu positioned in a window graphical user interface element that is displayed by the user interface of the device; and receiving user edits to a message of the messages through a text box positioned in the window graphical user interface element.

The method may include the following step: receiving a user control command related to a test process associated with the test scenario through at least one of a start button, a pause button, and a stop button positioned in the window graphical user interface element.

The method may include the following step: displaying a tree structure that shows message identifiers associated with some of the messages through a tree view positioned in the window graphical user interface element.

The method may include the following steps: retrieving test scenario information from a test configuration file set; storing the test scenario information in a test scenario set; and displaying test scenario identifiers through the user interface of the device. The user input may be related to one of the test scenario identifiers.

The method may include the following steps: retrieving message bodies from a message library file set; and storing the message bodies in a message set. The messages may contain the message bodies.

The method may include the following step: retrieving message attribute information from a test configuration file set. The message attribute information may include information related to one or more of message serial numbers, message identifiers, trigger conditions, delay times, driver names, and message types associated with the messages.

The method may include the following step: displaying the message identifiers in a tree structure through the user interface of the device.

The method may include the following step: automatically determining a test configuration according to the test scenario. The test configuration may specify a least one of a quantity of control elements, a network address associated with the equipment automation program, a port configuration associated with the equipment automation program, and a driver related to transmission of one or more of the messages.

The method may include the following steps: automatically fetching a first message according to the test scenario, the first message being one of the messages; automatically determining whether a trigger is needed before sending the first message to the equipment automation program; and automatically sending the first message to the equipment automation program if no trigger is needed.

The method may include the following steps: after sending the first message, automatically determining whether all of the messages have been sent to the equipment automation program; and automatically fetching a second message according to the test scenario if one or more of the messages have not been sent to the equipment automation program.

The method may include the following steps: if the trigger is needed, automatically determining whether the trigger has arrived; automatically sending the first message to the equipment automation program after the trigger has arrived; and automatically waiting for the trigger if the trigger has not arrived.

The method may include the following steps: after the trigger has arrived, automatically determining whether a delay time is specified for the message; and automatically sending the first message to the equipment automation program after the delay time has been reached.

The method may include the following steps: receiving an equipment-automation-program-provided message from the equipment automation program, wherein a function code of the equipment-automation-program-provided message may be odd (i.e., an odd number); after the receiving, automatically determining whether the device is waiting for the trigger; and automatically sending a reply message to the equipment automation program if the device may be not waiting for the trigger, wherein a function code of the reply message may be even (i.e., an even number).

The method may include the following steps: if the device is waiting for the trigger, automatically determining whether the equipment-automation-program-provided message provides the trigger; and automatically sending the reply message to the equipment automation program if the equipment-automation-program-provided message does not provide the trigger.

The method may include the following steps: if the equipment-automation-program-provided message provides the trigger, automatically determining whether a function code of the first message is odd (i.e., an odd number) or even (i.e., an even number); automatically sending the reply message to the equipment automation program if the function code of the first message is odd (i.e., an odd number); and after sending the reply message, automatically sending the first message to the equipment automation program.

The method may include the following steps: if the function code of the first message is even (i.e., an even number), automatically sending the first message to the equipment automation program; after sending the first message, automatically determining whether all of the messages have been sent to the equipment automation program; and automatically fetching a second message according to the test scenario if one or more of the messages have not been sent to the equipment automation program.

The method may include the following step: after sending the first message, automatically recording at least one of the first message and information related to the first message in a log file. A file format of the log file may be identical to a file format of a stored message that is stored in a message library file. The first message may contain a message body of the stored message.

An embodiment may be related to a device for testing an equipment automation program. The device may include the following elements: a user interface configured to receive user input; a processor configured to automatically identify a test scenario based on the user input, configured to automatically and sequentially fetch a plurality of messages according to the test scenario, and configured to automatically and sequentially send the messages to the equipment automation program; and a hardware element configured to perform tasks associated with at least one of the user interface and the processor.

The processor may automatically send at least ten of the messages to the equipment automation program within a second.

The user interface may include a menu and a text box that are simultaneously displayed. The menu may display a test scenario identifier that is associated with the test scenario. The text box may display content of a message of the messages.

According to embodiments, a single user interface may facilitate test scenario selection, test message editing, and test process control. Advantageously, user training and/or user errors may be minimized.

According to embodiments, test scenario files may be composed in an Extensible Markup Language (XML) format according to open standards. Advantageously, user training may be substantially efficient.

According to embodiments, test messages may be set sequentially and/or automatically with minimum manual operation. Advantageously, satisfactory test accuracy and efficiency may be attained, and the equipment automation program can be timely utilized.

According to embodiments, multiple test records are provided in a same log file. Advantageously, reference to and verification of the test records may be satisfactorily convenient.

The above summary is related to some of many embodiments of the invention disclosed herein and is not intended to limit the scope of the invention.

BRIEF DESCRIPTION OF THE DRAWINGS

FIG. 5 illustrates a file format of a test scenario file used in a device and a method for testing an EAP in accordance with one or more embodiments.

DETAILED DESCRIPTION

Example embodiments are described with reference to the accompanying drawings. As those skilled in the art would realize, the described embodiments may be modified in various ways. Some embodiments may be practiced without some or all of these specific details. Well known process steps and/or structures may not be described in detail, such that description of embodiments may not be unnecessarily obscured.

The drawings and description are illustrative and not restrictive. Like reference numerals may designate like (e.g., analogous or identical) elements. Repetition of description may be avoided.

Relative sizes and thicknesses of elements shown in the drawings are for facilitate description and understanding, without limiting embodiments. In the drawings, thicknesses of some layers, films, panels, regions, etc., may be exaggerated for clarity.

Although the terms "first", "second", etc. may be used herein to describe various elements, these elements should not be limited by these terms. These terms may be used to distinguish one element from another element. A first element discussed below may be termed a second element without departing from teachings of embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

If a first element (such as a layer, film, region, or substrate) is referred to as being "on", "neighboring", "connected to", or "coupled with" a second element, then the first element can be directly on, directly neighboring, directly connected to, or directly coupled with the second element, or an intervening element may also be present between the first element and the second element. If a first element is referred to as being "directly on", "directly neighboring", "directly connected to", or "directed coupled with" a second element, then no intended intervening element (except environmental elements such as air) may be provided between the first element and the second element.

The terminology used herein is for the purpose of describing particular embodiments and is not intended to limit the invention. As used herein, the singular forms, "a", "an", and "the" may indicate plural forms as well, unless the context clearly indicates otherwise. The terms "includes" and/or "including", when used in this specification, may specify the presence of stated features, integers, steps, operations, elements, and/or components, but may not preclude the presence or addition of one or more other features, integers, steps, operations, elements, components, and/or groups.

Unless otherwise defined, terms (including technical and scientific terms) used herein have the same meanings as commonly understood by one of ordinary skill in the art related to this invention. Terms, such as those defined in commonly used dictionaries, should be interpreted as having meanings that are consistent with their meanings in the context of the relevant art and should not be interpreted in an idealized or overly formal sense unless expressly so defined herein.

The term "connect" may mean "electrically connect".

Unless explicitly described to the contrary, the word "comprise" and variations such as "comprises", "comprising", "include", or "including" may imply the inclusion of stated elements but not the exclusion of other elements.

Various embodiments, including methods and techniques, are described in this disclosure. Embodiments of the invention may also cover an article of manufacture that includes a non-transitory computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out operations pertaining to embodiments of the invention. Examples of such apparatus include a general purpose computer and/or a dedicated computing device when appropriately programmed and may include a combination of a computer/computing device and dedicated/programmable hardware circuits (such as electrical, mechanical, and/or optical circuits) adapted for the various operations pertaining to embodiments of the invention.

Figure 1:
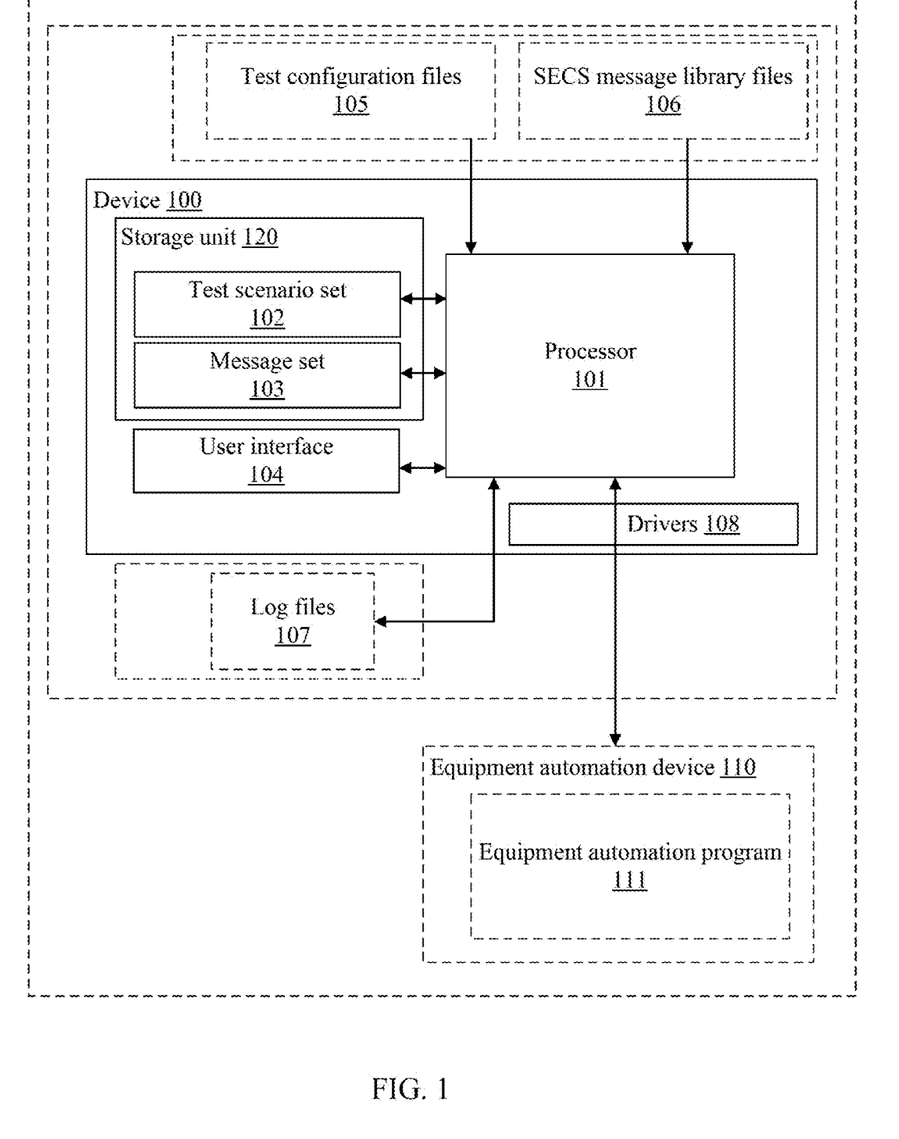
FIG. 1 shows a schematic block diagram that illustrates elements and/or structures in a device for testing an equipment automation program (EAP) in accordance with one or more embodiments.

FIG. 1 shows a schematic block diagram that illustrates elements and/or structures in a device 100 for testing an equipment automation program 111 (EAP 111) in accordance with one or more embodiments. For minimizing risks and costs, in place of real equipment, the device 100 may perform simulated tests on the EAP 111. In an embodiment, the EAP 111 may be implemented in an equipment automation device 110 that is electrically connected to the device 100. In an embodiment, the EAP 111 may be implemented in the device 100. The device 100 (or a processor 101 in the device 100) may use control elements according to the High-Speed SECS Message Service (HSMS) mode of Win-SECS.ocx for performing data transmission with the EAP 111. Each control element of the device 100 may use a unique network address (e.g., (Internet Protocol or IP address) and/or a unique network port (e.g., IP port) to communicate with a corresponding network address and/or a corresponding network port of a control element associated with the EAP 111.

Referring to FIG. 1, the device 100 may include a processor 101, a user interface 104, a non-transitory storage unit 120, and a set of drivers 108. The user interface 104 may include a display unit. The storage unit 120 may store a test scenario set 102 and a message set 103. The device 100 may include hardware and/or software for performing one or more tasks associated with the processor 101, the user interface 104, the storage unit 120, the drivers 108, the test scenario set 102, and the message set 103.

The processor 101 may be electrically connected to one or more non-transitory storage units that may store a set of test configuration files 105 and a set of SEMI Equipment Communications Standard (SECS) message library files 106. In an embodiment, the one or more storage units may be external to the device 100. In an embodiment, the one or more storage units may be part of the device 100 and/or may be the storage unit 120.

The processor 101 may be electrically connected to a non-transitory storage unit that may store a set of log files 107. In an embodiment, the storage unit may be external to the device 100. In an embodiment, the storage unit may be part of the device 100 and/or may be the storage unit 120.

Figure 2:
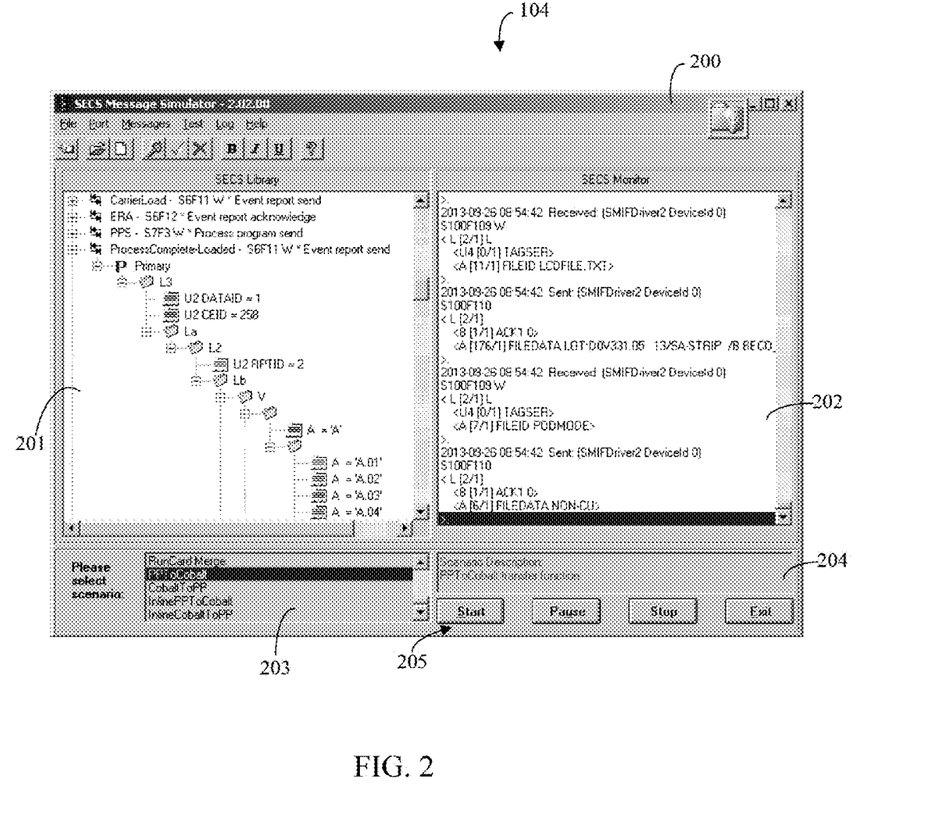
FIG. 2 shows a schematic block diagram that illustrates elements and/or structures in a user interface of a device for testing an EAP in accordance with one or more embodiments.

FIG. 2 shows a schematic block diagram that illustrates elements and/or structures in the user interface 104 of the device 100 in accordance with one or more embodiments. The user interface 104 may display graphical user interface elements, including a tree view 201, a text box 202, a menu 203, an information section 204, and a set of control buttons 205. The tree view 201, the text box 202, the menu 203, the information section 204, and the set of control buttons 205 may be displayed in a same window graphical user interface element 200 displayed by the user interface 104.

The tree view 201 may display a tree structure that shows message identifiers (e.g., icons and/or names) associated with SEMI Equipment Communications Standard (SECS) messages that are contained in the SECS message library files 106, SECS messages that are contained in the message set 103, and/or SECS messages that are associated with a test scenario selected through the menu 203 by a user of the device 100. Through the tree view 201, the user may select a message, e.g., by clicking on the associated message identifier using a point-and-click device. Content of the selected message may be displayed in the text box 202.

The text box 202 may display a message that is sent from the device 100 to the EAP 111, a message that is sent from the EAP 111 to the device 100, and/or a message selected by the user through the tree view 201. The message displayed in the text box 202 may be updated in real time according to message transmission between the display device 100 and the EAP 111. The user may edit the content of the message display in the text box 202.

The menu 203, e.g., a dropdown menu, may display a list of test scenario identifiers associated with available test scenarios. Through the menu 203, the user may select a test scenario, e.g., by clicking on the associated test scenario identifier using the point-and-click device. Information related to the selected scenario may be displayed in the information section 204.

The set of control buttons 205 may enable the user to control a test process. The control buttons 205 may include a start button, a pause/resume button, a stop button, and an exit button. The start button may trigger a start of a test process. The pause/resume button may trigger a pause or resumption of the test process. The stop button may trigger a stop of the test process. The exit button may trigger an exit of the window and/or the graphical user interface elements. The user can click on the buttons using the point-and-click device.

The user interface 104 may also support manual message sending.

Figure 3:
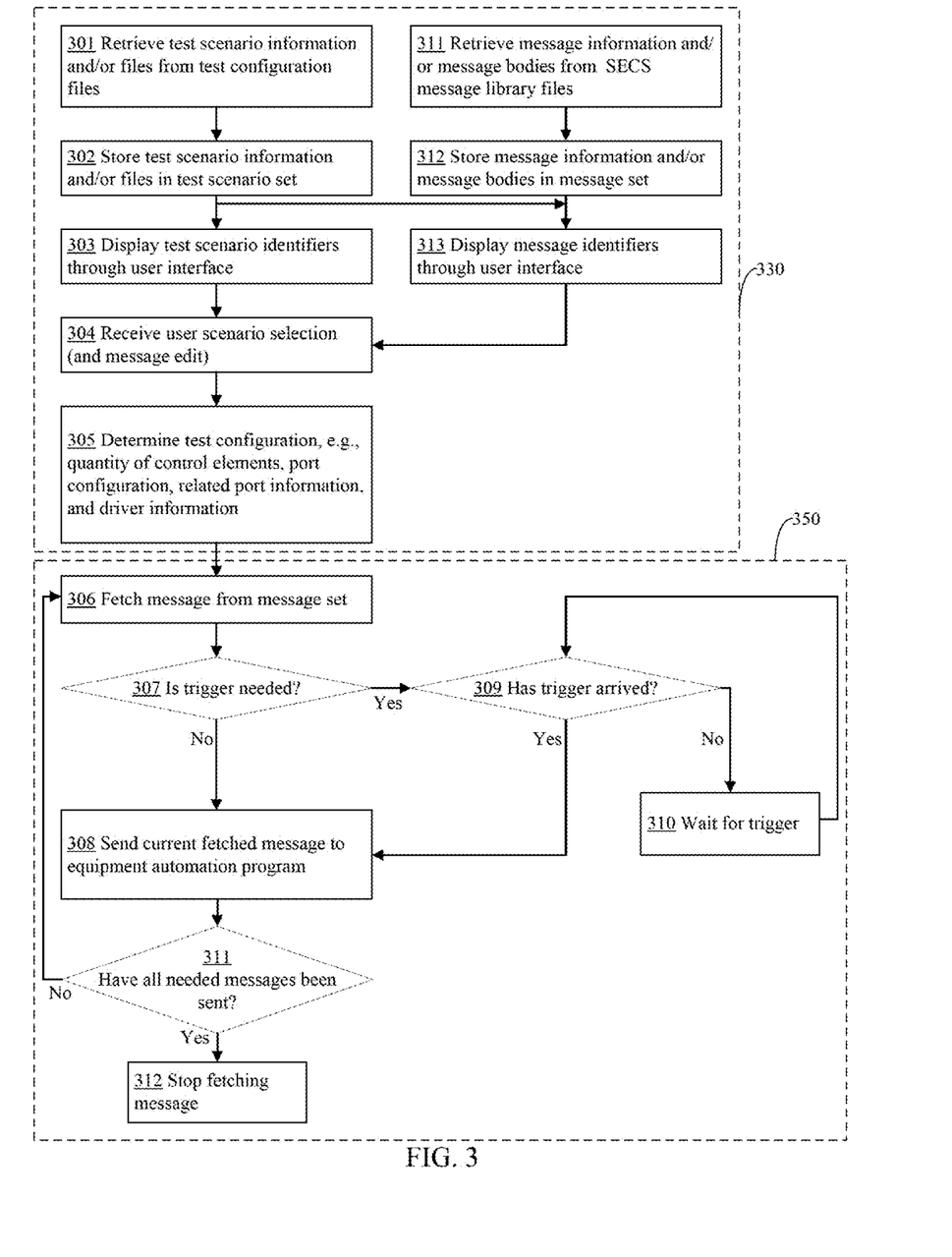
FIG. 3 shows a flowchart that illustrates steps in a method for testing an EAP in accordance with one or more embodiments.

FIG. 3 shows a flowchart that illustrates steps in a method for testing the EAP 111 using the device 100 in accordance with one or more embodiments. In the description of the steps, the processor 101 may represent the processor 101 and/or the device 100. The processor 101 and/or the device 100 may automatically perform many actions associated with the steps.

The steps may include initialization steps 330 and testing steps 350. The initialization steps 330 may include steps 301, 302, 303, 311, 312, 313, 304, and 305. The testing steps 350 may include steps 306, 307, 308, 309, 310, 311, and 312.

In step 301, the processor 101 may retrieve test scenario information and/or test scenario files that contain test scenario information from test configuration files 105. Subsequent to step 301, in step 302, the processor 101 may store the retrieved test scenario information and/or test scenario files in the test scenario set 102. Subsequent to step 302, in step 303, based on test scenario information and/or test scenario files stored in the test scenario set 102, the processor 101 may display test scenario identifiers through (or in) the user interface 104. The user may select a test scenario using the user interface 104. In the test scenario set 102, a test scenario may specify an equipment set and a related quantity, Standard Mechanical Interfaces (SMIFs) and a related quantity, tags and a related quantity, whether the equipment set is a batch-run equipment set, and/or some attributes of required SECS messages that are to be used for testing the EAP 111. The attributes may include one or more of message serial numbers, message identifiers (or message names), trigger conditions, delay times, driver names, message types, etc.

FIG. 5 illustrates a file format of a test scenario file used in the device 100 and the method for testing the EAP 111 in accordance with one or more embodiments. A test scenario file may be composed in an Extensible Markup Language (XML) format according to open standards. Advantageously, the test scenario file may be substantially clear and easily understood by the user.

In step 311, the processor 101 may retrieve (and analyze) message information and/or message bodies from SECS message library files 106. Subsequent to step 311, in step 312, the processor 101 may store the retrieved message information and/or message bodies in the message set 103. Subsequent to step 302 and step 312, in step 313, based on message attribute information stored in the test scenario set 102 and/or the message bodies stored in message set 103, the processor 101 may display message identifiers (or message names) through (or in) the user interface 104. The user may select and edit messages using the text box 202 the user interface 104.

Figure 6:
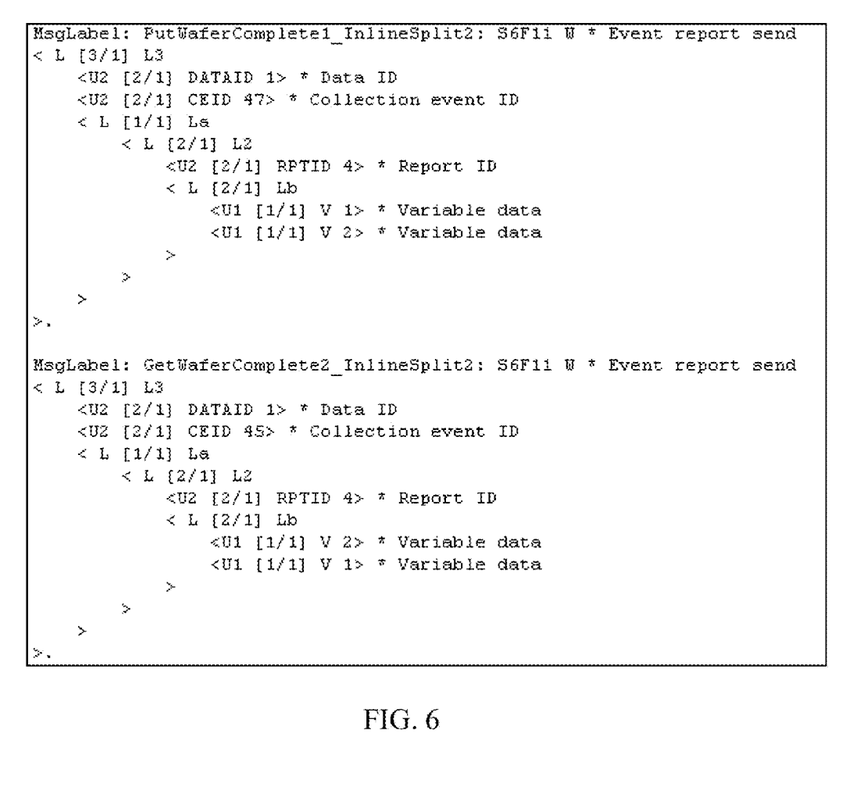
FIG. 6 illustrates a file format of a message used in a device and a method for testing an EAP in accordance with one or more embodiments.

FIG. 6 illustrates a file format of a message used in the device 100 and a method for testing the EAP 111 in accordance with one or more embodiments. The message may represent a message stored in the SECS message library files 106, a message stored in the message set 103, and/or a message displayed through the text box 202 of the user interface 104.

Subsequent to step 303 and/or step 313, in step 304, the processor 101 may receive the user's selection of a test scenario identifier. The processor 101 may also receive the user's edits to one or more messages related to the test scenario.

Subsequent to step 304, in step 305, based on characteristics of the equipment corresponding to the test scenario selected by the user, the processor 101 may determine a test configuration associated with the selected test scenario. For example, the test configuration may specify a quantity of WinSECS control elements, network addresses (associated with each of the device 100 and the EAP 111), port configuration (associated with each of the device 100 and the EAP 111), and/or driver information related to the test scenario.

Subsequent to step 305, testing steps 350 may be performed. Based on the test scenario identifier of the test scenario selected by the user, in step 306, the processor the processor 101 may fetch a message (current message) from the message set 103 and may obtain related attribute information from the test scenario set. The testing steps 350 may be automatically performed a plurality of times, such that step 306 may be automatically performed a plurality of times, wherein the processor 101 may automatically sequentially fetch messages associated with the test scenario. In an embodiment, the processor 101 may fetch at least tens of messages in a second.

A message may be an SECS message according to open standards. A message may have a steam code (e.g., in a range of 0 to 127), a function code (e.g., in a range of 0 to 255), a transaction timeout mechanism, and/or an automatic reply function. A message may be a primary message or a secondary message. A primary message may have an odd-numbered function code. A secondary message may have an even-numbered function code. A transaction may consist of a primary message and a second message. In a transaction, the primary message may have an odd-numbered function code and may precede the secondary message, and the secondary message may have an even-numbered function code and may be subsequent to the primary message.

Subsequent to step 306, based on the attribute information associated with the fetched message (current message), the processor 101 may determine whether a trigger is needed for sending the current message. The processor 101 may also determine whether a delay time is specified for the current message.

If no trigger is needed (and if no delay is needed) for sending the current message, in step 308, the processor 101 may use a driver that corresponds to the current message to send the current message to the EAP 111. The driver may be one of the drivers 108 illustrated in FIG. 1.

If a trigger is needed for sending the current message, in step 309, the processor 101 may determine whether the trigger has arrived.

If the trigger has arrived, in step 308, the processor 101 may use the corresponding driver to send the current message to the EAP 111 (if no delay is needed or after delay time has been reached).

If the trigger has not arrived, in step 310, the processor 101 may continue to wait for the trigger. In step 309, the processor 101 may determine whether the trigger has arrived.

Subsequent to step 308, in step 311, the processor 101 may determine whether all messages required for the selected test scenario have been sent to the EAP 111.

If one or more required messages have not been sent to the EAP 111, in step 306, the processor the processor 101 may fetch a message (next message) and obtain related attribute information from the message set 103.

If all required messages have been sent to the EAP 111, in step 312, the processor 101 may stop fetching messages.

The testing steps 350 may be automatically performed a plurality of times, such that step 308 may be automatically performed a plurality of times, wherein the processor 101 may automatically sequentially send messages associated with the test scenario to the EAP 111. In an embodiment, the processor 101 may automatically send at least tens of messages to the EAP 111 within a second. Advantageously, satisfactory test efficiency may be attained.

The processor 101 may automatically record SECS messages sent to the EAP 111, SECS messages received from the EAP 111, and/or information related to the SECS messages in the a log file of the log files 107. The processor 101 may automatically generate the log file according to an equipment type and/or a date associated with the performed test.

Figure 7:
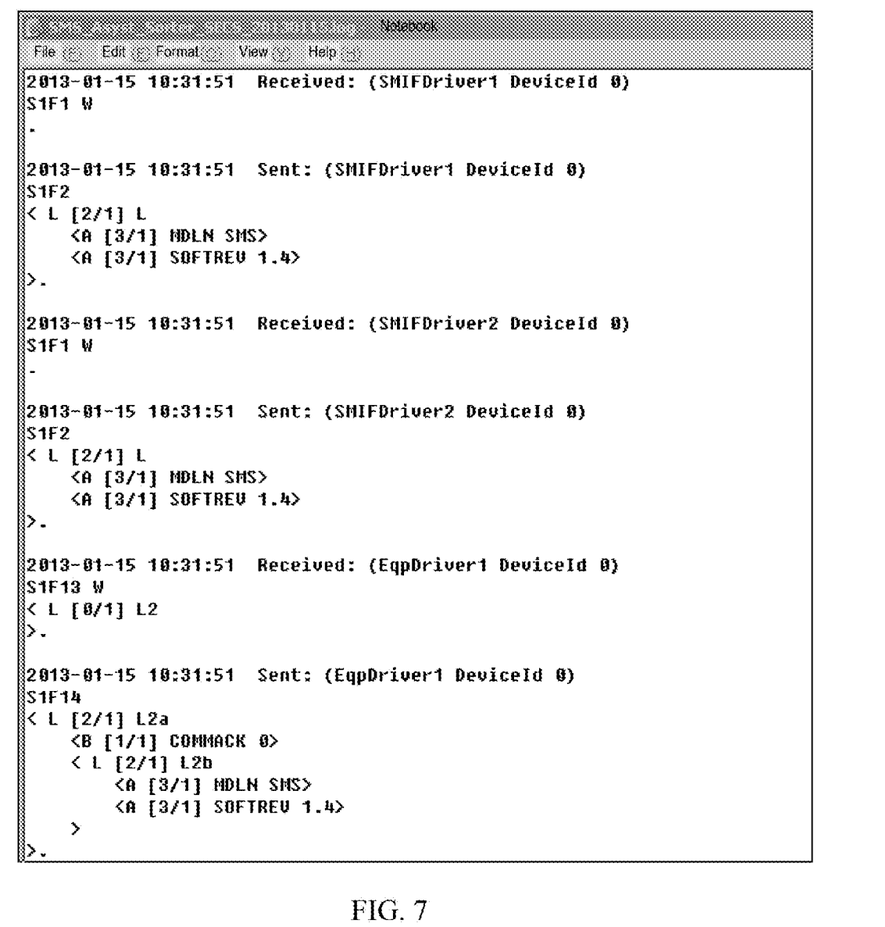
FIG. 7 illustrates a file format of a log file used in a device and a method for testing an EAP in accordance with one or more embodiments.

FIG. 7 illustrates a file format of the log file used in the device 100 and the method for testing the EAP 111 in accordance with one or more embodiments.

Messages related to multiple test entities, e.g., multiple pieces of equipment, multiple SMIFs, and/or multiple tags, may be recorded in a same log file and may be differentiated using different labels, such as EqpDriver1, SMIFDriver1, SMIFDriver2, etc.

A file format of the SECS messages recorded in the log file may be identical to a file format of the message bodies of the messages stored in the message set 103 and/or a file format of the message bodies of the messages stored in the SEC message library files 106. Advantageously, processing and/or editing of the messages in the message set 103 and the log files 107 may be substantially convenient and/or efficient.

Figure 4:
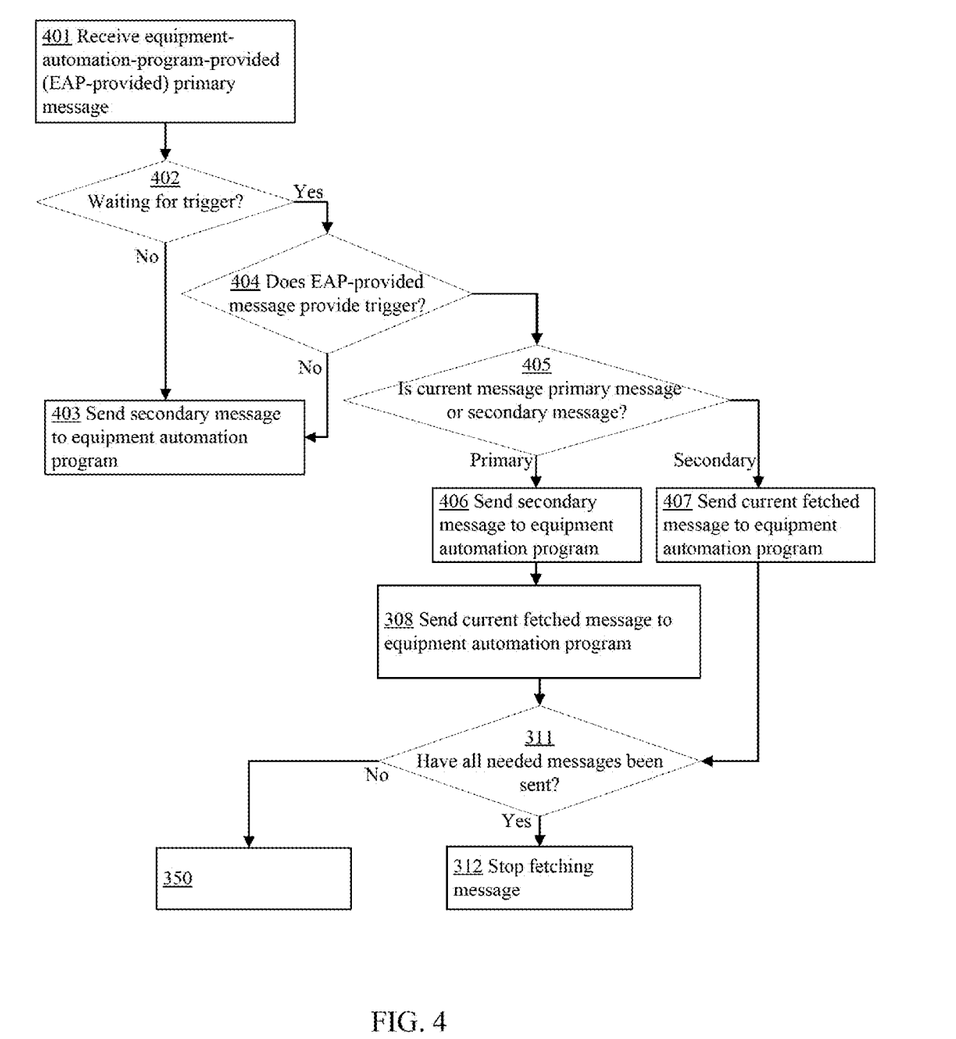
FIG. 4 shows a flowchart that illustrates steps in a method for testing an EAP in accordance with one or more embodiments.

FIG. 4 shows a flowchart that illustrates steps in a method for testing an EAP 111 using the device 100 in accordance with one or more embodiments. In the description of the steps, the processor 101 may represent the processor 101 and/or the device 100. The processor 101 and/or the device 100 may automatically perform many actions associated with the steps. During one or more of the testing steps 350 illustrated in FIG. 3, in step 401 illustrated in FIG. 4, the device 100 (and/or the processor 101) may receive an EAP-provided message from the EAP 111. The EAP-provide message may be a primary message, which may have an odd-numbered function code.

Subsequent to step 401, in step 402, the processor 101 may determine whether the processor 101 is waiting for a trigger for sending a current message fetched in step 306.

If the processor 101 is not waiting for any trigger, in step 403, the processor 101 may send a secondary message as a reply message, which may have an even-numbered function code, to the EAP 111 in response to the EAP-provide primary message to complete a transaction.

If the processor 101 is waiting for a trigger, in step 404, the processor 101 may determine whether the EAP-provided primary message provides (i.e., is or includes) the awaited trigger.

If the EAP-provided primary message does not provide the trigger, in step 403, the processor 101 may send a secondary message, which may have an even-numbered function code, to the EAP 111 in response to the EAP-provide primary message to complete a transaction.

If the EAP-provided primary message provides the trigger, in step 405, the processor 101 may determine whether the current message (fetched in step 306) is a primary message or a secondary message.

If the current message is a primary message, of which the function code is an odd number, in step 406, the processor 101 may send a secondary message to the EAP 111 to complete a transaction. Subsequent to step 406, the processor 101 may perform step 308 and subsequent steps discussed with reference to FIG. 3.

If the current message is a secondary message, of which the function code is an even number, in step 407, the processor 101 may send the current message to the EAP 111 to complete a transaction. Subsequent to step 407, the processor 101 may perform step 311 and subsequent steps discussed with reference to FIG. 3.

According to embodiments, a single user interface may facilitate test scenario selection, test message editing, and test process control. Advantageously, user training and/or user errors may be minimized.

According to embodiments, test scenario files may be composed in an Extensible Markup Language (XML) format according to open standards. Advantageously, user training may be substantially efficient.

According to embodiments, test messages may be set sequentially and/or automatically with minimum manual operation. Advantageously, satisfactory test accuracy and efficiency may be attained, and the EAP can be timely utilized.

According to embodiments, multiple test records are provided in a same log file. Advantageously, reference to and verification of the test records may be satisfactorily convenient.

While some embodiments have been described as examples, there are alterations, permutations, and equivalents, which fall within the scope of possible embodiments. It should also be noted that there are many alternative ways of implementing the described methods and apparatuses. Furthermore, embodiments may find utility in other applications. The abstract section is provided herein for convenience and, due to word count limitation, is accordingly written for reading convenience and should not be employed to limit the scope of the claims. It is therefore intended that the following appended claims be interpreted as including all such alterations, permutations, and equivalents.

What is claimed is:

1. A method for testing an equipment automation program, the method being performed using a device that includes hardware, the method comprising:
   receiving user input through a user interface of the device;
   automatically identifying a test scenario based on the user input;
   automatically and sequentially fetching a plurality of messages according to the test scenario;
   automatically fetching a first message according to the test scenario, the first message being one of the messages;
   automatically sending the first message to the equipment automation program; and
   after sending the first message, automatically recording at least one of the first message and information related to the first message in a log file,
   wherein a file format of the log file is identical to a file format of a stored message that is stored in a message library file, and
   wherein the first message contains a message body of the stored message.

2. The method of claim 1, wherein at least tens of the messages are automatically sent from the device to the equipment automation program within a second.

3. The method of claim 1, comprising:
   receiving the user input through a menu positioned in a window graphical user interface element that is displayed by the user interface of the device; and
   receiving user edits to a message of the messages through a text box positioned in the window graphical user interface element.

4. The method of claim 3, comprising:
   receiving a user control command related to a test process associated with the test scenario through at least one of a start button, a pause button, and a stop button positioned in the window graphical user interface element.

5. The method of claim 3, comprising:
displaying a tree structure that shows message identifiers associated with some of the messages through a tree view positioned in the window graphical user interface element.

6. The method of claim 1, comprising:
retrieving test scenario information from a test configuration file set;
storing the test scenario information in a test scenario set; and
displaying test scenario identifiers through the user interface of the device,
wherein the user input is related to one of the test scenario identifiers.

7. The method of claim 1, comprising:
retrieving message bodies from a message library file set; and
storing the message bodies in a message set,
wherein the messages contain the message bodies.

8. The method of claim 1, comprising:
retrieving message attribute information from a test configuration file set,
wherein the message attribute information includes information related to one or more of message serial numbers, message identifiers, trigger conditions, delay times, driver names, and message types associated with the messages.

9. The method of claim 8, comprising:
displaying the message identifiers in a tree structure through the user interface of the device.

10. The method of claim 1, comprising:
automatically determining a test configuration according to the test scenario,
wherein the test configuration specifies a least one of a quantity of control elements, a network address associated with the equipment automation program, a port configuration associated with the equipment automation program, and a driver related to transmission of one or more of the messages.

11. A method for testing an equipment automation program, the method being performed using a device that includes hardware, the method comprising:
receiving user input through a user interface of the device;
automatically identifying a test scenario based on the user input;
automatically and sequentially fetching a plurality of messages according to the test scenario;
automatically fetching a first message according to the test scenario, the first message being one of the messages;
automatically determining whether a trigger is needed before sending the first message to the equipment automation program;
automatically sending the first message to the equipment automation program if no trigger is needed;
receiving an equipment-automation-program-provided message from the equipment automation program, wherein a function code of the equipment-automation-program-provided message is odd;
after the receiving, automatically determining whether the device is waiting for the trigger; and
automatically sending a reply message to the equipment automation program if the device is not waiting for the trigger, wherein a function code of the reply message is even.

12. The method of claim 11, comprising:
if the trigger is needed, automatically determining whether the trigger has arrived;
automatically sending the first message to the equipment automation program after the trigger has arrived; and
automatically waiting for the trigger if the trigger has not arrived.

13. The method of claim 12, comprising:
after the trigger has arrived, automatically determining whether a delay time is specified for the first message; and
automatically sending the first message to the equipment automation program after the delay time has been reached.

14. The method of claim 11, comprising:
automatically and sequentially sending the messages to the equipment automation program.

15. The method of claim 11, comprising:
if the device is waiting for the trigger, automatically determining whether the equipment-automation-program-provided message provides the trigger; and
automatically sending the reply message to the equipment automation program if the equipment-automation-program-provided message does not provide the trigger.

16. The method of claim 15, comprising:
if the equipment-automation-program-provided message provides the trigger, automatically determining whether a function code of the first message is odd or even;
automatically sending the reply message to the equipment automation program if the function code of the first message is odd; and
after sending the reply message, automatically sending the first message to the equipment automation program.

17. The method of claim 16, comprising:
if the function code of the first message is even, automatically sending the first message to the equipment automation program;
after sending the first message, automatically determining whether all of the messages have been sent to the equipment automation program; and
automatically fetching a second message according to the test scenario if one or more of the messages have not been sent to the equipment automation program.

18. The method of claim 11, comprising:
after sending the first message, automatically recording at least one of the first message and information related to the first message in a log file,
wherein a file format of the log file is identical to a file format of a stored message that is stored in a message library file, and
wherein the first message contains a message body of the stored message.

19. A device for testing an equipment automation program, the device comprising:
a user interface configured to receive user input;
a processor configured to automatically identify a test scenario based on the user input, configured to automatically and sequentially fetch a plurality of messages according to the test scenario, and configured to automatically send at least tens of the messages to the equipment automation program within a second; and
a hardware element configured to perform tasks associated with at least one of the user interface and the processor.

20. The device of claim 19, wherein the user interface comprises a menu and a text box that are simultaneously displayed, wherein the menu displays a test scenario identifier that is associated with the test scenario, and wherein the text box displays content of a message of the messages.

\* \* \* \* \*